Aug. 28, 1945.  E. S. JEFFERSON  2,383,552
HARNESS
Filed Jan. 12, 1945
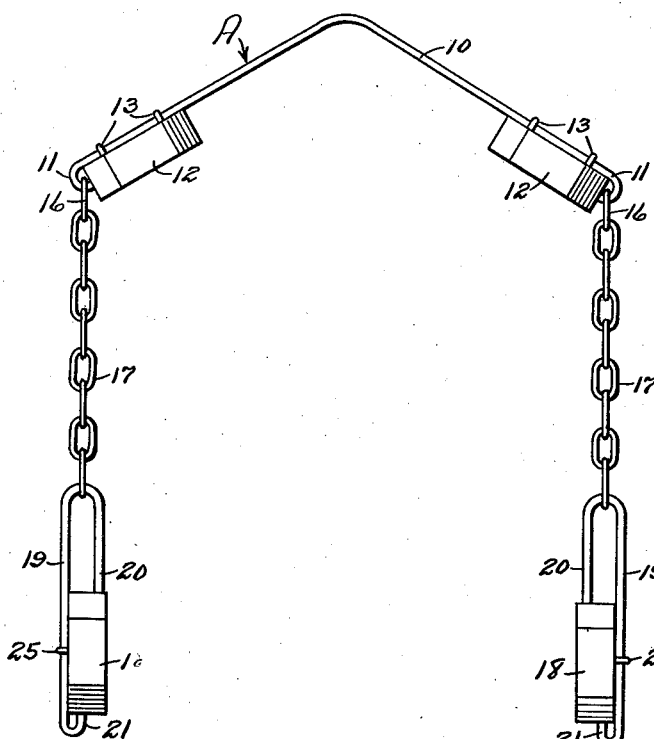
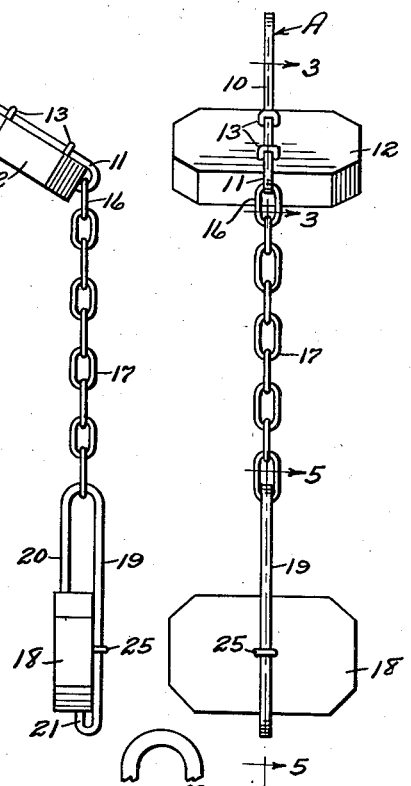
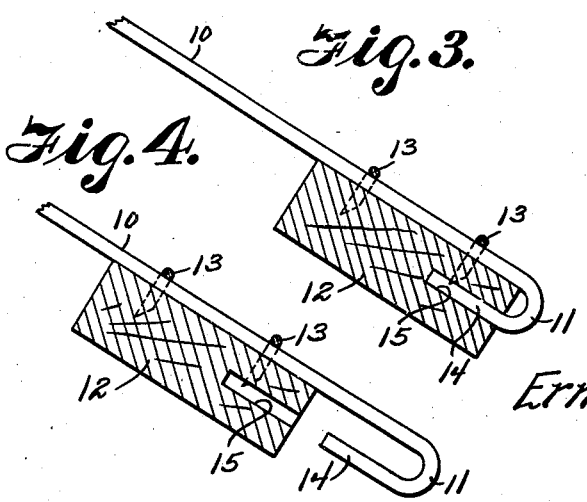
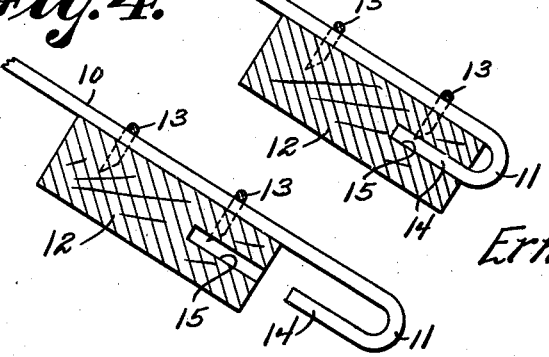
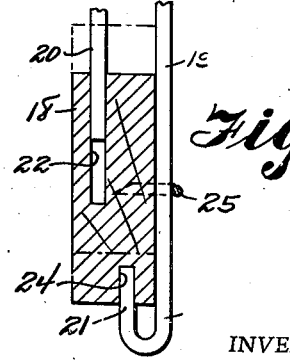
INVENTOR.
Ernest S. Jefferson
BY Victor J. Evans & Co.
ATTORNEYS Patented Aug. 28, 1945

2,383,552

UNITED STATES PATENT OFFICE 2,383,552

HARNESS

Ernest S. Jefferson, Belhaven, N. C.

Application January 12, 1945, Serial No. 572,466

4 Claims. (Cl. 54—38)

The invention relates to harness, and more especially to a draft animal saddle in the harnessing of such animal.

The primary object of the invention is the provision of an article of this character, wherein the traces for the draft of a load are detachably held in place by the saddle in a novel and unique manner, so that such traces will not become free during the draft of the said load and while in active duty.

Another object of the invention is the provision of an article of this character, wherein the traces of harness are held removed from contact with the body of the animal, so as to avoid injury through frictional contact therewith, the traces being coupled with the harness saddle with ease and dispatch and in a simplified manner.

A further object of the invention is the provision of an article of this character, wherein the bearings for the harness saddle are employed for the latching of the traces to the latter, and such traces can be detached at will to enable unharnessing of a draft animal with ease and dispatch, and also without undue labor.

A still further object of the invention is the provision of an article of this character, which is simple in construction, thoroughly reliable and efficient in operation, strong, durable, readily and easily operated, eliminating injury to an animal, safe, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is an elevation of the harness saddle constructed in accordance with the invention.

Figure 2 is a side view thereof.

Figure 3 is a sectional view taken on the line 3—3 of Figure 2 looking in the direction of the arrows.

Figure 4 is a view similar to Figure 3 with the parts in adjusted relation to each other.

Figure 5 is a sectional view taken on the line 5—5 of Figure 2 looking in the direction of the arrows.

Similar reference characters indicate corresponding parts throughout the several views in the drawing.

Referring to the drawing in detail, A designates generally the draft harness saddle constructed in accordance with the invention, which comprises a back saddling strap 10 formed from metal or any other suitable material having strength and rigidity and of substantially V-shape in order to straddle the back of a draft animal, in the usual manner.

The strap 10 has downwardly and inwardly turned hook ends 11 which are at opposite extremities thereof, and next to these ends 11 are arranged slidable bearing blocks 12, the strap 10 being attached to the upper faces of the latter by staples 13, and in this manner the said blocks 12 can be engaged over and from the bills 14 of the said ends 11, as the said bills are accommodated in sockets 15 therefor as provided in the said blocks, best seen in Figures 3 and 4 of the drawing. These hooks or ends 11 detachably receive selected upper links 16 of a flexible chain 17 arranged at each side of the draft animal. The chains 17 suspend additional bearing blocks 18, each being slidably fitted to a hanger hook 19, having its frame provided with opposed or double bills 20 and 21, respectively. The bill 20 is slidably fitted in a way 22 therefor in the block 18, while the bill 21 is releasably engageable in a socket 24 so that the hook having the bill 21 can be opened and closed, it being at the lowermost end of each block 18, and in which is detachably engaged the trace, not shown, of the harness for draft purposes.

The hook bill 20 is selectively engaged in the links 16 of the chain 17 to vary the length thereof, and these hooks on all blocks are arranged so as not to injure the animal by contact therewith. The hooks 19 are connected to the blocks 18 by staples 25, as best seen in Figure 5 of the drawing.

The saddle A is, of course, preferably used with a saddle pad of any well known construction, and not herein shown, as it forms no part of the present invention.

What is claimed is:

1. An article of the kind described, comprising a back strap formed from rigid material and having hook end provided with bills, and bearing blocks slidably fitted to the strap next to the bills and cooperating therewith for the opening and closing of their hooks.

2. An article of the kind described, comprising a back strap formed from rigid material and having hook ends provided with bills, bearing blocks slidably fitted to the strap next to the bills and cooperating therewith for the opening and closing of their hooks and suspension chains detachably latched in the hooks by the blocks engaging the bills thereof.

3. An article of the kind described, comprising a back strap formed from rigid material and having hook ends provided with bills, bearing blocks slidably fitted to the strap next to the bills and cooperating therewith for the opening and closing of their hooks, suspension chains detachably latched in the hooks by the blocks engaging the bills thereof and additional bearing blocks adjustably connected to the suspension chains.

4. An article of the kind described, comprising a back strap formed from rigid material and having hook ends provided with bills, bearing blocks slidably fitted to the strap next to the bills and cooperating therewith for the opening and closing of their hooks, suspension chains detachably latched in the hooks by the blocks engaging the bills thereof, additional bearing blocks and double bill hooks slidably connected to the additional blocks for effecting the latching of said blocks with the chains and the connection of draft traces to the said additional blocks.

ERNEST S. JEFFERSON.